United States Patent
Chang et al.

(10) Patent No.: US 9,639,167 B2
(45) Date of Patent: May 2, 2017

(54) CONTROL METHOD OF ELECTRONIC APPARATUS HAVING NON-CONTACT GESTURE SENSITIVE REGION

(71) Applicant: EMINENT ELECTRONIC TECHNOLOGY CORP. LTD., Hsinchu (TW)

(72) Inventors: Tom Chang, Taipei (TW); Kao-Pin Wu, New Taipei (TW); Chih-Jen Fang, Tainan (TW); Chan-Peng Lo, Taichung (TW); Cheng-Ta Chuang, New Taipei (TW)

(73) Assignee: EMINENT ELECTRONIC TECHNOLOGY CORP. LTD., Hsinchu (TW)

( * ) Notice: Subject to any disclaimer, the term of this patent is extended or adjusted under 35 U.S.C. 154(b) by 104 days.

(21) Appl. No.: 14/720,837

(22) Filed: May 25, 2015

(65) Prior Publication Data

US 2015/0346829 A1 Dec. 3, 2015

Related U.S. Application Data

(60) Provisional application No. 62/004,912, filed on May 30, 2014.

(30) Foreign Application Priority Data

May 6, 2015 (TW) .............................. 104114376 A

(51) Int. Cl.
*G09G 5/00* (2006.01)
*G06F 3/01* (2006.01)
(Continued)

(52) U.S. Cl.
CPC ............ *G06F 3/017* (2013.01); *G06F 3/0484* (2013.01); *G06F 3/0486* (2013.01); *G06F 3/04842* (2013.01)

(58) Field of Classification Search
CPC combination set(s) only.
See application file for complete search history.

(56) References Cited

U.S. PATENT DOCUMENTS

2004/0140984 A1* 7/2004 Hinckley ............ G06F 3/03547
345/684
2008/0005703 A1* 1/2008 Radivojevic .......... G06F 1/1626
715/863

(Continued)

FOREIGN PATENT DOCUMENTS

CN 101061507 A 10/2007
CN 101776948 A 7/2010
(Continued)

*Primary Examiner* — Jonathan Boyd
*Assistant Examiner* — Sosina Abebe
(74) *Attorney, Agent, or Firm* — patenttm.us

(57) ABSTRACT

A control method of an electronic apparatus is provided. The electronic apparatus has a non-contact gesture sensitive region. The control method includes: identifying at least one object type of at least one non-contact object within the non-contact gesture sensitive region in a plurality of object types; determining respective numbers of non-contact objects corresponding to the identified at least one object type; detecting motion information of the at least one non-contact object within the non-contact gesture sensitive region; recognizing a non-contact gesture corresponding to the at least one non-contact object according to the identified at least one object type, the respective numbers of non-contact objects and the motion information; and enabling the electronic apparatus to perform a specific function according to the non-contact gesture.

12 Claims, 16 Drawing Sheets

(51) Int. Cl.
  *G06F 3/0486* (2013.01)
  *G06F 3/0484* (2013.01)

(56) References Cited

U.S. PATENT DOCUMENTS

| | | | | |
|---|---|---|---|---|
| 2009/0103780 A1* | 4/2009 | Nishihara | ............... | G06F 3/017 382/103 |
| 2011/0291988 A1* | 12/2011 | Bamji | .................. | G06F 3/0428 345/175 |
| 2011/0310005 A1* | 12/2011 | Chen | ..................... | G06F 1/3203 345/156 |
| 2013/0265220 A1* | 10/2013 | Fleischmann | ........... | G06F 3/017 345/156 |
| 2013/0283213 A1* | 10/2013 | Guendelman | ......... | G06F 3/0488 715/848 |
| 2013/0293510 A1 | 11/2013 | Clifton et al. | | |
| 2015/0160819 A1* | 6/2015 | Hwang | ............... | G06F 3/04817 715/769 |
| 2015/0213244 A1* | 7/2015 | Lymberopoulos | ...... | G06F 21/32 726/18 |

FOREIGN PATENT DOCUMENTS

| | | |
|---|---|---|
| CN | 102971701 A | 3/2013 |
| EP | 2463751 A2 | 6/2012 |
| TW | 200928865 A | 7/2009 |
| TW | 201314495 A | 4/2013 |
| TW | 201314555 A | 4/2013 |
| TW | 201344596 A | 11/2013 |

\* cited by examiner

CONTROL METHOD OF ELECTRONIC APPARATUS HAVING NON-CONTACT GESTURE SENSITIVE REGION

CROSS REFERENCE TO RELATED APPLICATIONS

This application claims the benefit of U.S. provisional application No. 62/004,912, filed on May 30, 2014, the contents of which are incorporated herein by reference.

BACKGROUND OF THE INVENTION

1. Field of the Invention

The disclosed embodiments of the present invention relate to a non-contact gesture control mechanism, and more particularly, to a method for controlling an electronic apparatus according to motion information of at least one non-contact object within a non-contact gesture sensitive region of the electronic apparatus.

2. Description of the Prior Art

A touch-based electronic apparatus provides a user with user-friendly interaction. However, it is inconvenient for the user to control the electronic apparatus when the user holds other objects in a user's hand (e.g. documents or drinks) or the user's hand is oily. For example, while eating French fries and reading an electronic book displayed on a screen of a tablet computer, the user prefers to turn pages of the electronic book without touching the screen using oily fingers.

Thus, a novel control mechanism is needed to allow the user to operate an electronic apparatus intuitively without touching it.

SUMMARY OF THE INVENTION

It is therefore one objective of the present invention to provide a method for controlling an electronic apparatus according to motion information of at least one non-contact object within a non-contact gesture sensitive region of the electronic apparatus, to solve the above-mentioned problems.

According to an embodiment of the present invention, an exemplary control method of an electronic apparatus is disclosed. The electronic apparatus has a non-contact gesture sensitive region. The exemplary control method comprises the following steps: identifying at least one object type of at least one non-contact object within the non-contact gesture sensitive region in a plurality of object types; determining respective numbers of non-contact objects corresponding to the identified at least one object type; detecting motion information of the at least one non-contact object within the non-contact gesture sensitive region; recognizing a non-contact gesture corresponding to the at least one non-contact object according to the identified at least one object type, the respective numbers of non-contact objects and the motion information; and enabling the electronic apparatus to perform a specific function according to the non-contact gesture.

According to another embodiment of the present invention, an exemplary control method of an electronic apparatus is disclosed. The electronic apparatus has a non-contact gesture sensitive region. The exemplary control method comprises the following steps: identifying a number of non-contact objects of at least one non-contact object within the non-contact gesture sensitive region; detecting motion information of the at least one non-contact object within the non-contact gesture sensitive region; recognizing a non-contact gesture corresponding to the at least one non-contact object according to the number of non-contact objects and the motion information; and enabling the electronic apparatus to perform a specific function according to the non-contact gesture.

The proposed control method of an electronic apparatus cannot only provide non-contact human-computer interaction but also meet requirements of various and intuitive non-contact gestures. Hence, the proposed non-contact control method can be combined with (or replace) a touch control method (e.g. using a mouse or a touch panel to control the electronic apparatus), and can be employed in various operating systems (e.g. Windows operating system or Android operating system).

These and other objectives of the present invention will no doubt become obvious to those of ordinary skill in the art after reading the following detailed description of the preferred embodiment that is illustrated in the various figures and drawings.

DETAILED DESCRIPTION

In order to provide intuitive and user-friendly non-contact human-computer interaction, the proposed non-contact control method may not only determine motion information of non-contact object(s) (e.g. object position information and time information) within a non-contact gesture sensitive region of an electronic apparatus, but also identify object type(s) of the non-contact object(s) and respective numbers of objects corresponding to the identified object type(s). Hence, the proposed non-contact control method may define corresponding non-contact gesture(s) (i.e. air gesture(s) untouching the electronic apparatus) according to the aforementioned information associated with the non-contact object(s), thereby enabling the electronic apparatus to perform corresponding function(s). In the following, the proposed non-contact control mechanism is described with reference to a multimedia playback apparatus capable of detecting a non-contact gesture. However, this is for illustrative purposes only. The proposed non-contact control mechanism may be employed in other types of electronic apparatuses capable of detecting a non-contact gesture.

Figure 1:
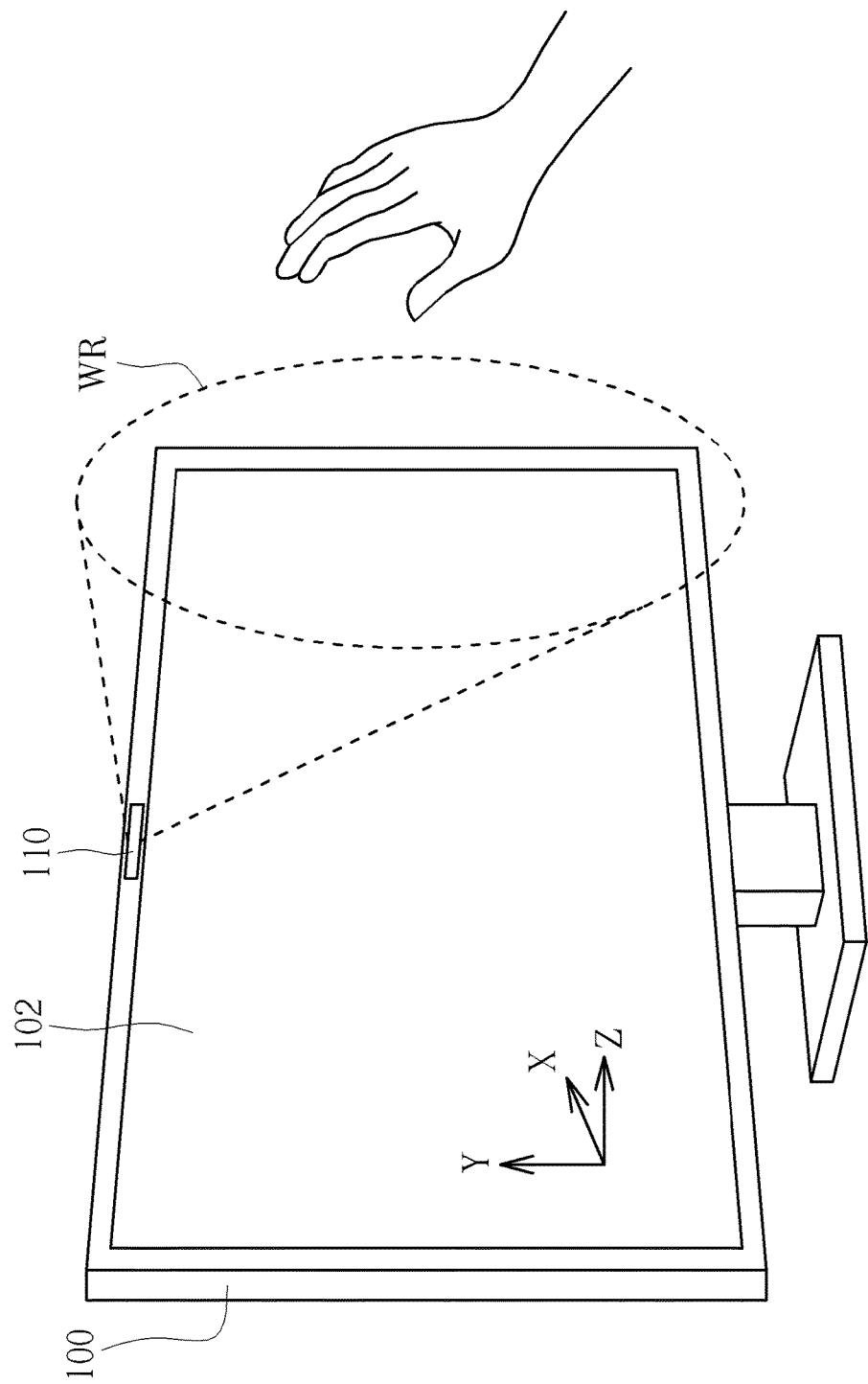
FIG. 1 is a diagram illustrating an exemplary electronic apparatus according to an embodiment of the present invention.

Please refer to FIG. 1, which is a diagram illustrating an exemplary electronic apparatus according to an embodiment of the present invention. The electronic apparatus 100 is implemented by a multimedia playback apparatus (e.g. a video player) in this embodiment, wherein the electronic apparatus 100 has a non-contact gesture sensitive region WR for detecting non-contact object(s) around the electronic apparatus 100. Additionally, the electronic apparatus 100 may define a space coordinate system in the surroundings thereof, and may include a display surface 102 and an optical sensor module 110, wherein the optical sensor module 110 may be disposed on an outer periphery of the display surface 102 (or a frame of the electronic apparatus 100) so as to provide the non-contact gesture sensitive region WR in front of the display surface 102 (facing the user). The optical sensor module 110 may obtain position information of a reflecting object (located within the non-contact gesture sensitive region WR) in the space coordinate system according to a reflected signal reflected from the reflecting object, thereby identifying depth information and motion information of the reflecting object. It should be noted that reflecting objects of different types (e.g. a fingertip and a palm) may have different depth maps (image contours). Further, for illustrative purposes, the Z-axis direction is defined as a normal vector of the display surface 102 in this embodiment. One skilled in the art should understand that this is not meant to be a limitation of the present invention.

The optical sensor module 110 may have other sensing functions. For example, the optical sensor module 110 may be implemented by an integrated sensor module, which integrates multiple functions such as image sensing, ambient light sensing (including ambient color sensing and ambient color temperature sensing), proximity sensing, temperature sensing, object position detection, depth information detection and/or gesture recognition. Hence, the optical sensor module 110 may detect three-dimensional image information of a non-contact object (e.g. a user's hand) around the electronic apparatus 100, and output the three-dimensional image information of the non-contact object to an image processing system in the next stage (not shown in FIG. 1) for further processing.

Figure 2:
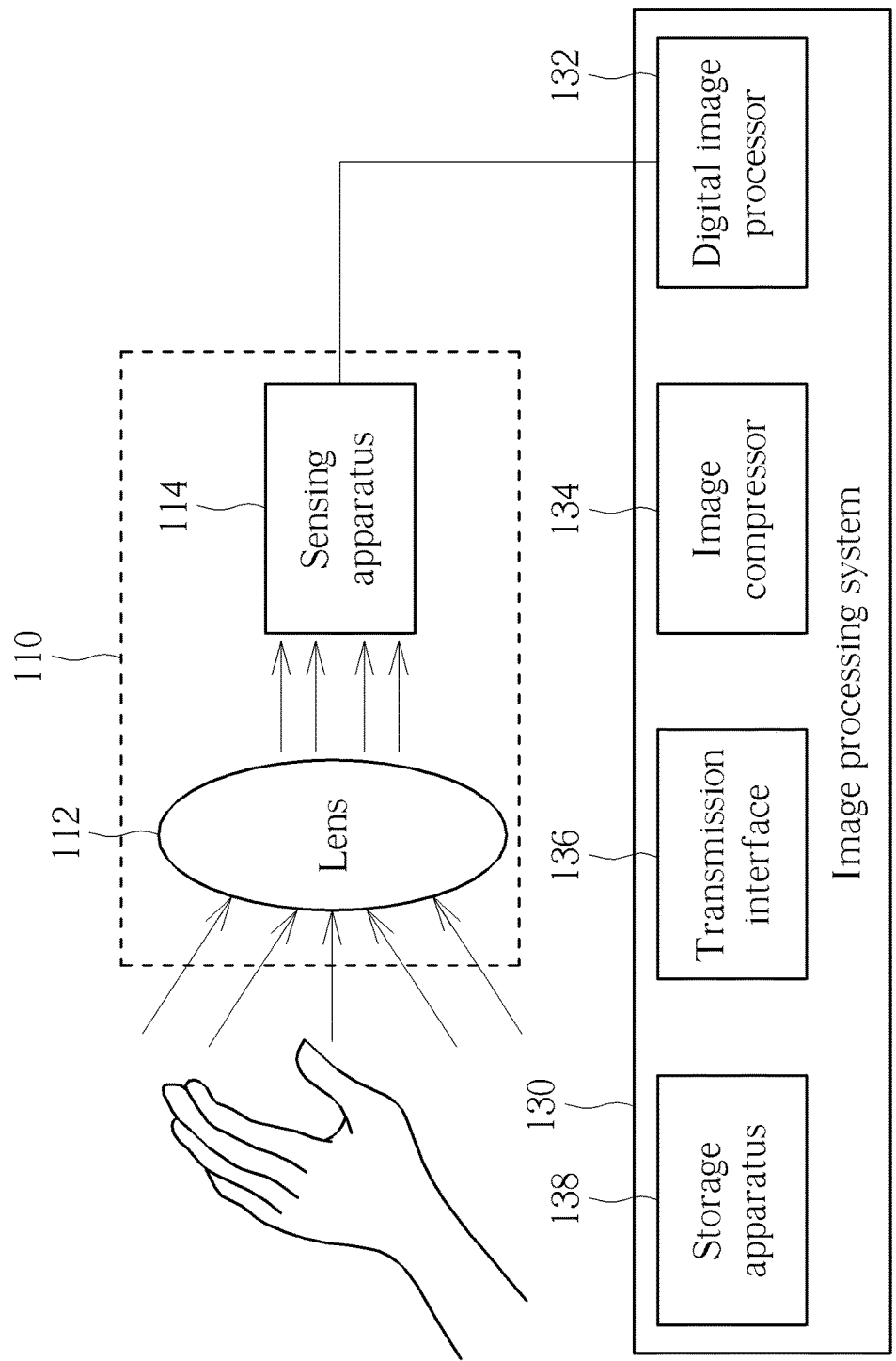
FIG. 2 is a block diagram of an implementation of an image processing system of the electronic apparatus shown in FIG. 1.

Please refer to FIG. 2, which is a block diagram of an implementation of an image processing system of the electronic apparatus 100 shown in FIG. 1. In this implementation, the optical sensor module 100 may include, but is not limited to, a lens 112 and a sensing apparatus 114 (having integrated sensing functions). The image processing system 130 is coupled to the optical sensor module 110, and may include a digital image processor 132, an image compressor 134, a transmission interface 136 (e.g. a parallel interface or a serial interface) and a storage apparatus 138 (e.g. storing a complete image frame). Consider a case where the image processing system 130 is operative to capture an image of a user's hand. The lens 112 may collect light reflected from the user's hand and direct the collected light to the sensing apparatus 114. Next, the sensing apparatus 114 may generate three-dimensional image information to the image processing system 130 according to received light signals. As a person skilled in the art should understand image processing operations performed upon the generated image information by the digital image processor 132, the image compressor 134, the transmission interface 136 and the storage apparatus 138, further description of the image processing system 130 is omitted here for brevity.

Figure 3:
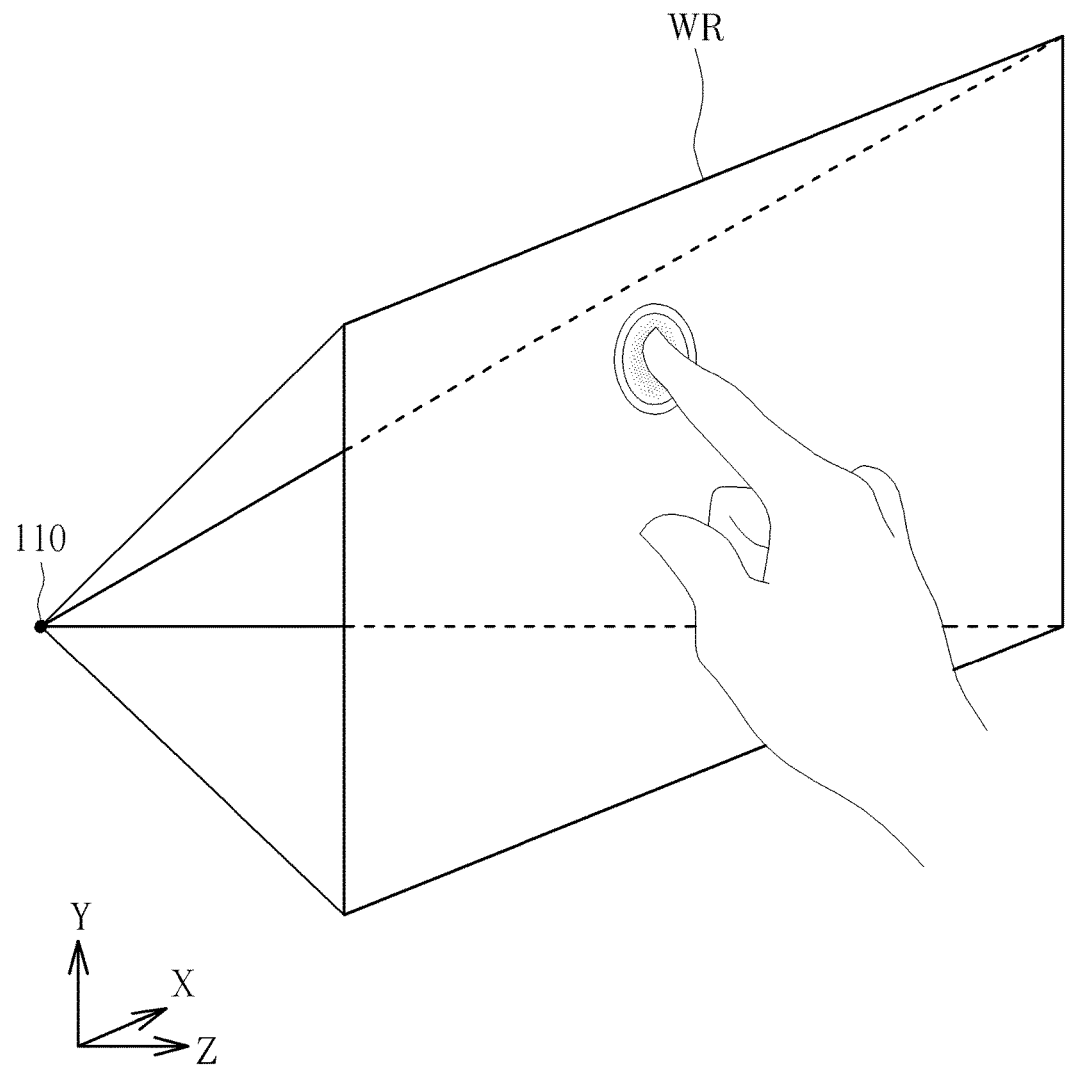
FIG. 3 is a diagram illustrating control over the electronic apparatus shown in FIG. 1 according to an embodiment of the present invention.

As the proposed optical sensor module may detect depth information and motion information of non-contact object(s) around an electronic apparatus, a corresponding non-contact gesture may be recognized according to type(s) of the non-contact object(s), the number of non-contact objects and motion of the non-contact object(s), thus enabling the electronic apparatus to perform a corresponding function. Please refer to FIG. 1 and FIG. 3 together. FIG. 3 is a diagram illustrating control over the electronic apparatus 100 shown in FIG. 1 according to an embodiment of the present invention. In this embodiment, the user's single fingertip first moves toward the display surface 102 (or the optical sensor module 110) over a predetermined distance within a predetermined period of time (e.g. 0.5 sec), and then moves away from the display surface 102 (or the optical sensor module 110). Regarding the optical sensor module 110, the optical sensor module 110 may identify that an reflecting object within the non-contact gesture sensitive region WR is the single fingertip (a single non-contact object), and refer to changes in reflected energy of the reflecting object to detect that the single fingertip completes the aforementioned movement toward and away from the display surface 102 (e.g. detecting changes in the Z coordinate of the single fingertip) within the predetermined period of time. In addition, the optical sensor module 110 may recognize a single tap gesture according to the object type of the reflecting object (i.e. the fingertip), the number of objects (i.e. one) and the aforementioned motion information of the reflecting object (completing a to and fro movement within the predetermined period of time), and enable the electronic apparatus 100 to activate or select a specific item displayed on the display surface 102 according to the single tap gesture. In view of this, the non-contact single tap gesture shown in FIG. 3 is similar to a single left mouse click used for selecting/activating a specific item, thus providing an intuitive and user-friendly experience for the user.

Figure 4:
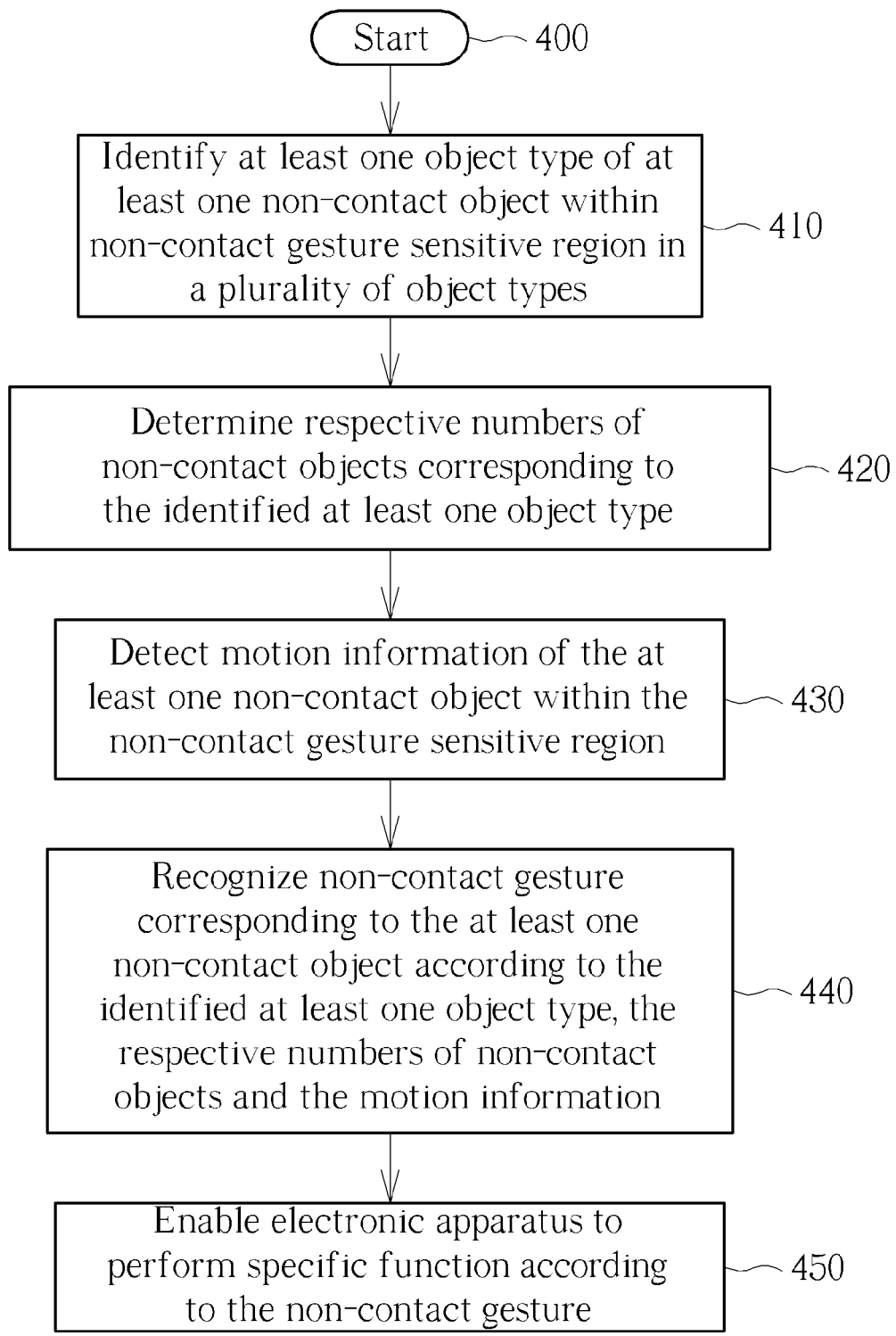
FIG. 4 is a flow chart of an exemplary control method of an electronic apparatus according to an embodiment of the present invention.

The aforementioned method for controlling the electronic apparatus 100 to perform a specific function may be summarized in FIG. 4. FIG. 4 is a flow chart of an exemplary control method of an electronic apparatus according to an embodiment of the present invention. Provided that the result is substantially the same, steps are not required to be executed in the exact order shown in FIG. 4. For example, the steps shown in FIG. 4 are not required to be contiguous;

other intermediate steps can be added. For illustrative purposes, the flow chart shown in FIG. 4 is described with reference to the embodiment shown in FIG. 3. The control method shown in FIG. 4 may be summarized as below.

Step 400: Start.

Step 410: Identify at least one object type of at least one non-contact object within the non-contact gesture sensitive region WR of the electronic apparatus 100 in a plurality of object types (e.g. a fingertip and a palm). In the embodiment shown in FIG. 3, the at least one object type of the at least one non-contact object is identified as a fingertip.

Step 420: Determine respective numbers of non-contact objects corresponding to the identified at least one object type (e.g. the number of fingertips is one).

Step 430: Detect motion information of the at least one non-contact object within the non-contact gesture sensitive region WR. For example, in the embodiment shown in FIG. 3, it is detected that the at least one non-contact object first moves toward the display surface 102 (or the optical sensor module 110) over a predetermined distance within a predetermined period of time, and then moves away from the display surface 102 (or the optical sensor module 110).

Step 440: Recognize a non-contact gesture corresponding to the at least one non-contact object (e.g. a single tap gesture) according to the identified at least one object type, the respective numbers of non-contact objects and the motion information.

Step 450: Enable the electronic apparatus 100 to perform a specific function (e.g. an item selection/activation function) according to the non-contact gesture.

As the proposed control method may determine/identify to which object type(s) the at least one non-contact object within the non-contact gesture sensitive region WR belongs in plurality of object types (step 410), and recognize the non-contact gesture corresponding to the at least one non-contact object according to the identified object type(s), the number of non-contact objects and the motion information, the user is allowed to use intuitive and various non-contact gestures to operate the electronic apparatus. To facilitating an understanding of the present invention, implementations of non-contact gesture control for an electronic apparatus are given in the following for further description. However, this is not meant to be a limitation of the present invention. As long as a non-contact gesture is recognized according to the number, type(s) and motion information of non-contact object(s), associated variations and modifications fall within the spirit and scope of the present invention.

Figure 5:
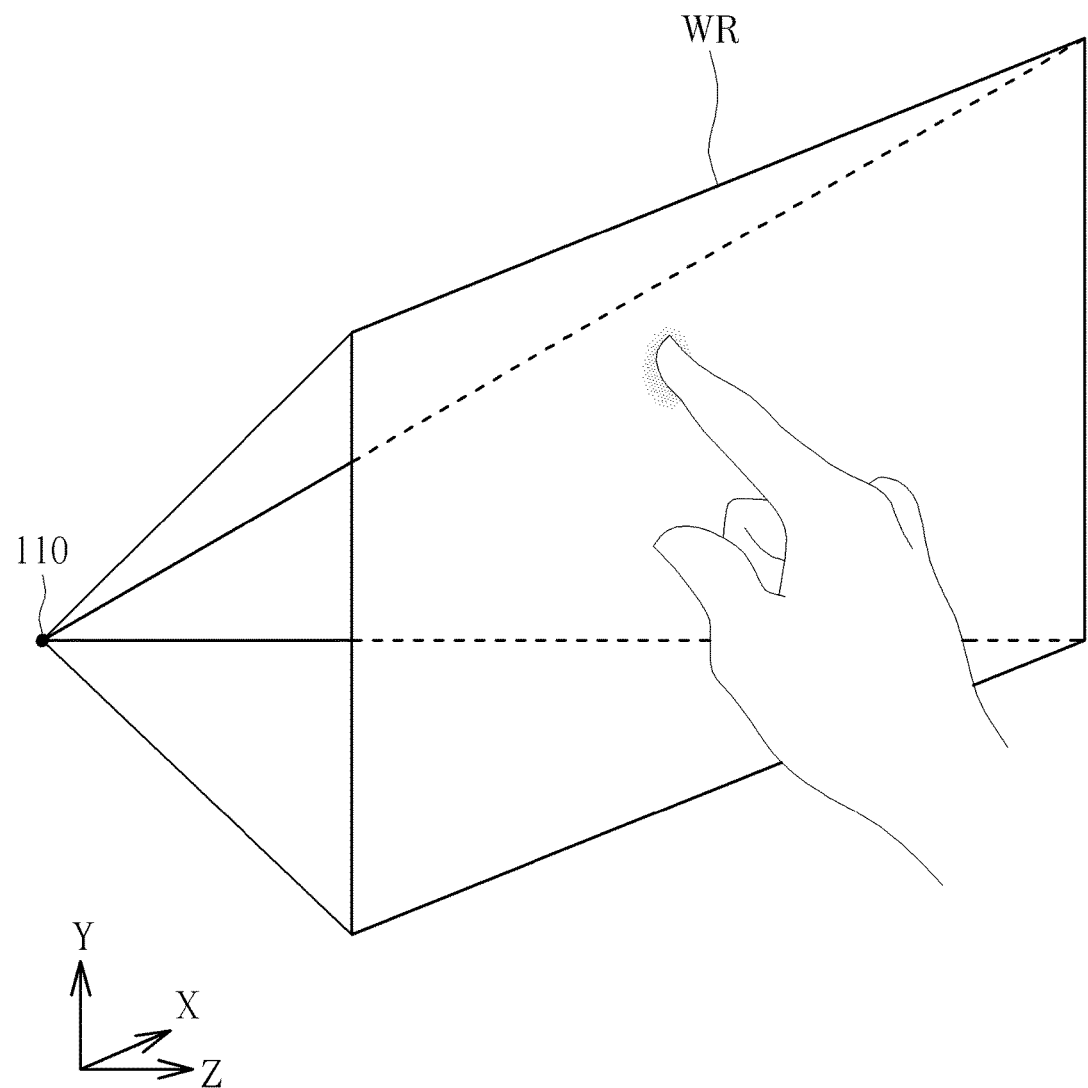
FIG. 5 is a diagram illustrating control over the electronic apparatus shown in FIG. 1 according to another embodiment of the present invention.

Please refer to FIG. 5 in conjunction with FIG. 1. FIG. 5 is a diagram illustrating control over the electronic apparatus 100 shown in FIG. 1 according to another embodiment of the present invention. In this embodiment, the optical sensor module 110 may identify that only one specific object of at least one non-contact object within the non-contact gesture sensitive region WR belongs to a specific object type. Specifically, the optical sensor module 110 detects only one fingertip (steps 410 and 420 shown in FIG. 4), wherein the fingertip located at an initial position stays at the initial position over a predetermined period of time (e.g. 1 sec) (step 430 shown in FIG. 4). For example, if a distance between the initial position and a coordinate position of the fingertip in a space coordinate system defined by the electronic apparatus 100 is less than a predetermined distance during the predetermined period of time, the fingertip may be regarded as staying at the initial position. Next, the optical sensor module 110 may refer to the aforementioned information (the fingertip stays at the initial position over the predetermined period of time) to recognize a hold gesture (step 440 shown in FIG. 4), and enable the electronic apparatus 100 to display detailed information of a specific item or open a specific function list according to the hold gesture (step 450 shown in FIG. 4). This is similar to a right mouse click.

Figure 6:
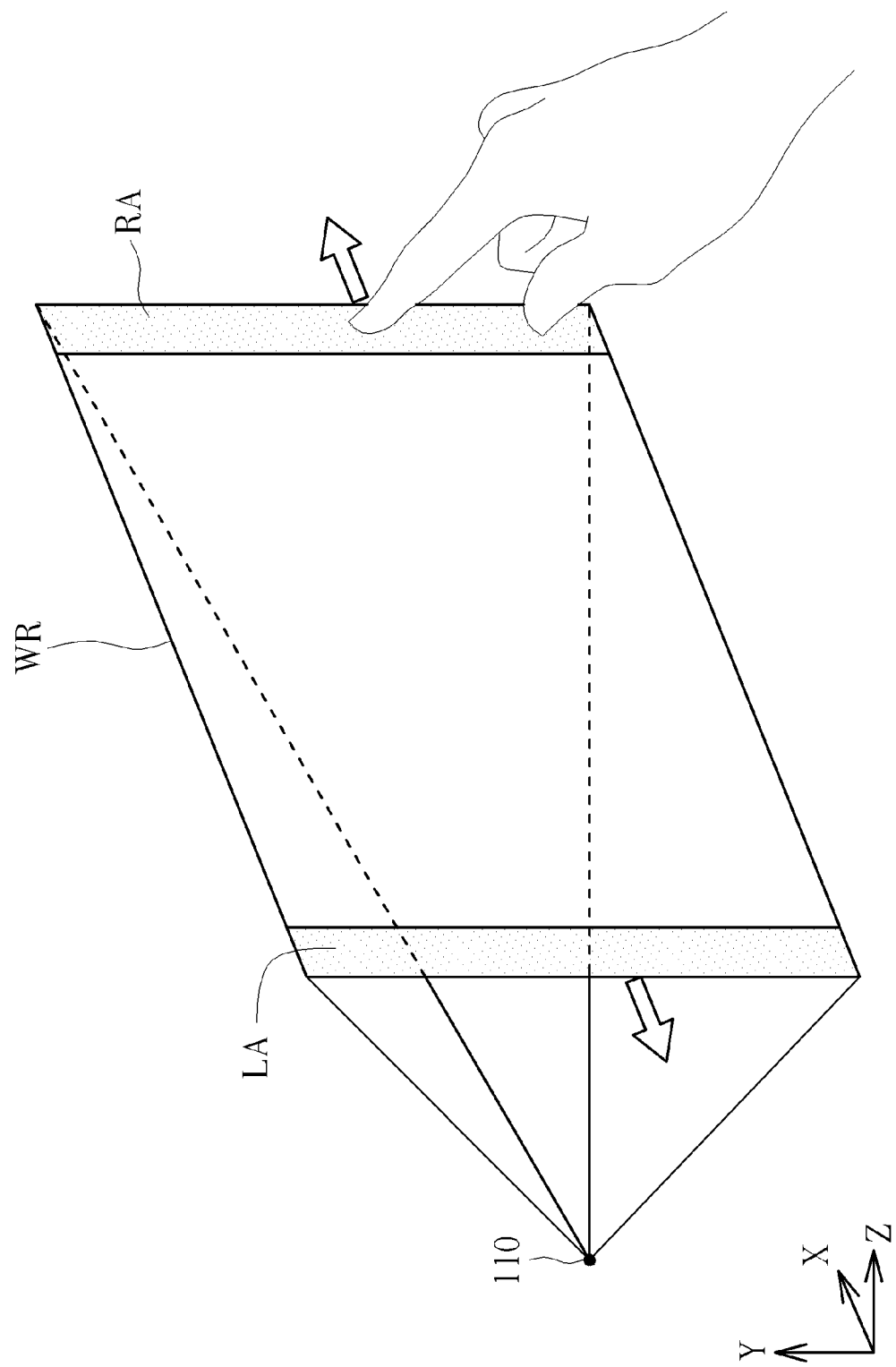
FIG. 6 is a diagram illustrating control over the electronic apparatus shown in FIG. 1 according to another embodiment of the present invention.

Please refer to FIG. 6 in conjunction with FIG. 1. FIG. 6 is a diagram illustrating control over the electronic apparatus 100 shown in FIG. 1 according to another embodiment of the present invention. In this embodiment, the optical sensor module 110 identifies only a single fingertip within the non-contact gesture sensitive region WR. When the single fingertip moves toward an edge of the non-contact gesture sensitive region WR (e.g. corresponding to an edge of a displayed content), a scrolling event may be triggered. For example, when the optical sensor module 110 detect that the single fingertip moves to a right area RA or a left area LA of the non-contact gesture sensitive region WR, the electronic apparatus 100 may perform a displayed content scrolling function such that the user may browse a content on the right/left side of the current displayed content. This is similar to scrolling a mouse wheel to scroll a displayed content.

Figure 7:
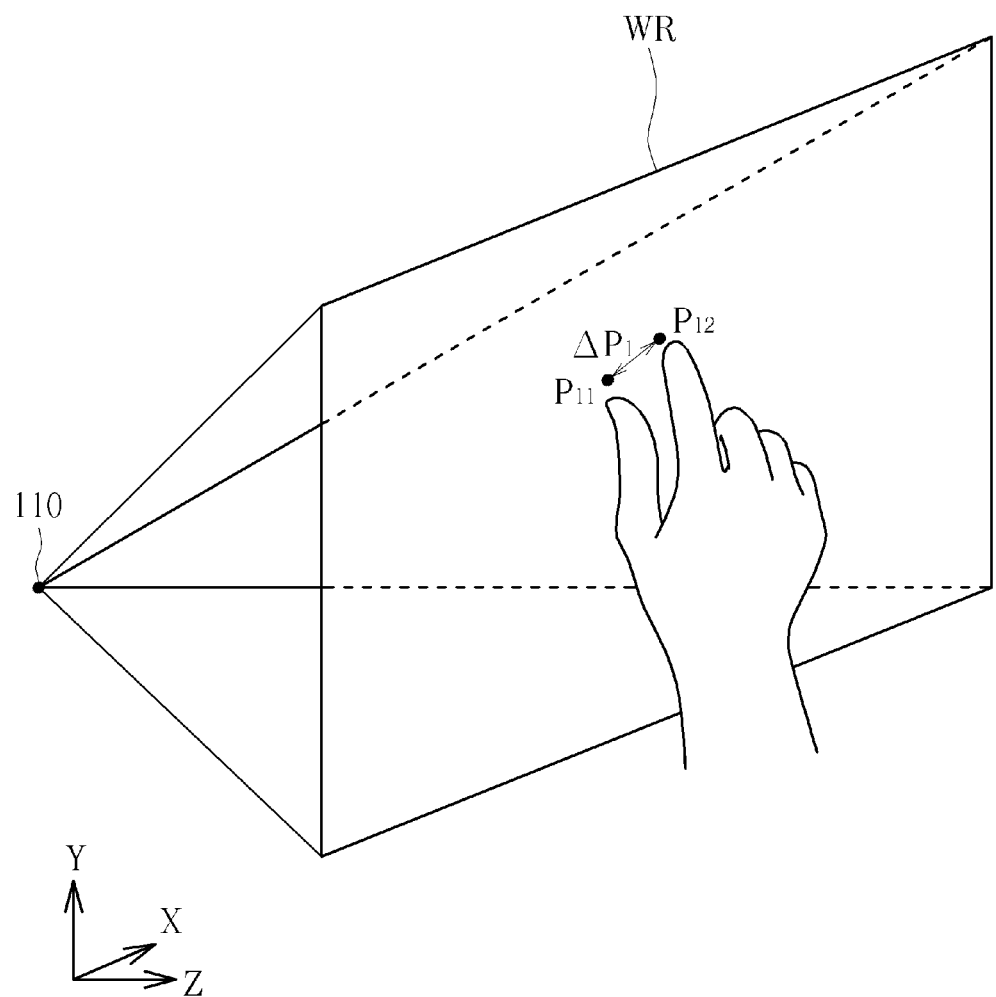
FIG. 7 is a diagram illustrating control over the electronic apparatus shown in FIG. 1 according to another embodiment of the present invention.

Please refer to FIG. 7 in conjunction with FIG. 1. FIG. 7 is a diagram illustrating control over the electronic apparatus 100 shown in FIG. 1 according to another embodiment of the present invention. In this embodiment, the optical sensor module 110 may determine that only two specific object of at least one non-contact object within the non-contact gesture sensitive region WR belongs to a specific object type. Specifically, the optical sensor module 110 detects two fingertips (located at an initial position $P_{11}$ and an initial position $P_{12}$, respectively). The optical sensor module 110 may further detect if the two fingertips stay at the initial position $P_{11}$ and the initial position $P_{12}$ over a predetermined period of time (e.g. 1 sec) respectively. When the two fingertips stay at the initial position $P_{11}$ and the initial position $P_{12}$ over the predetermined period of time respectively, the optical sensor module 110 may detect a relative distance $\Delta P_1$ between the two fingertips. In one implementation, when the two fingertips move away from each other (the relative distance $\Delta P_1$ increases), the optical sensor module 110 may recognize a zoom-in gesture, and accordingly enable the electronic apparatus 100 to perform a displayed content zooming in function. In another implementation, when the two fingertips approach each other (the relative distance $\Delta P_1$ decreases), the optical sensor module 110 may recognize a zoom-out gesture, and accordingly enable the electronic apparatus 100 to perform a displayed content zooming out function.

Figure 8:
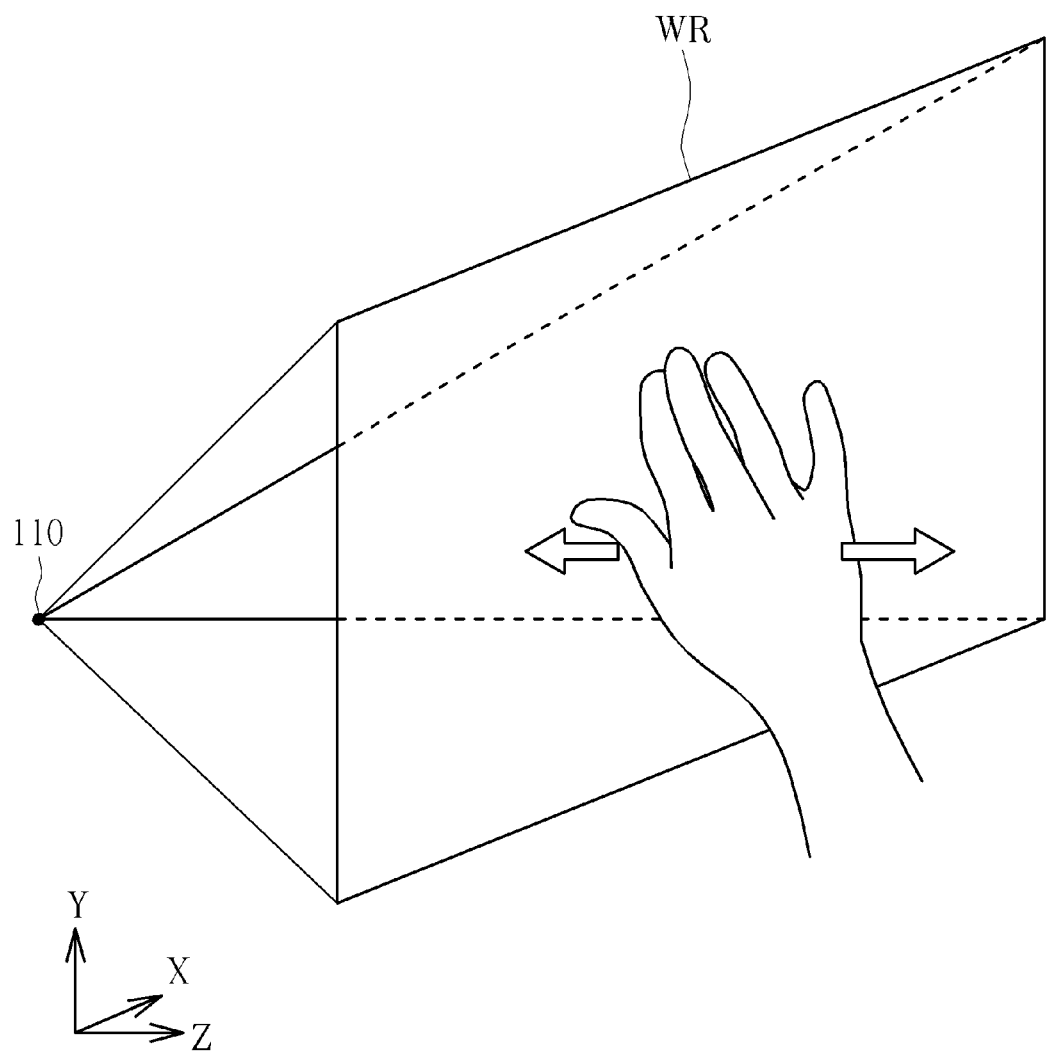
FIG. 8 is a diagram illustrating control over the electronic apparatus shown in FIG. 1 according to another embodiment of the present invention.

As the proposed control method may recognize a non-contact gesture according to the number, type(s) and motion information of non-contact object(s), non-contact gestures of the same kind (e.g. a zoom gesture) may be defined by different combinations of the number, type(s) and motion information of non-contact object(s). Please refer to FIG. 8 in conjunction with FIG. 1. FIG. 8 is a diagram illustrating control over the electronic apparatus 100 shown in FIG. 1 according to another embodiment of the present invention. In this embodiment, the optical sensor module 110 may determine that at least one non-contact object within the non-contact gesture sensitive region WR includes at least three first-type objects and a second-type object. Specifically, the optical sensor module 110 may determine that there are at least three fingertips and one palm included in the non-contact gesture sensitive region WR. The optical sensor module 110 may further detect if the palm located at an initial position stays at the initial position over a predetermined period of time (e.g. 1 sec). When the palm stays at the initial position over the predetermined period of time (i.e. the electronic apparatus 100 enters a zoom mode), the optical sensor module 110 may detect a relative distance between the palm and the display surface 102 (e.g. detecting changes in the Z coordinate of the palm). In one implementation, when the palm moves away from the display surface 102 (the relative distance increases), the optical sensor module 110 may recognize a zoom-out gesture, and accordingly enable the electronic apparatus 100 to perform a displayed content zooming out function. In another implementation, when the palm approaches (the relative distance decreases), the optical sensor module 110 may recognize a zoom-in gesture, and accordingly enable the electronic apparatus 100 to perform a displayed content zooming in function.

Figure 9:
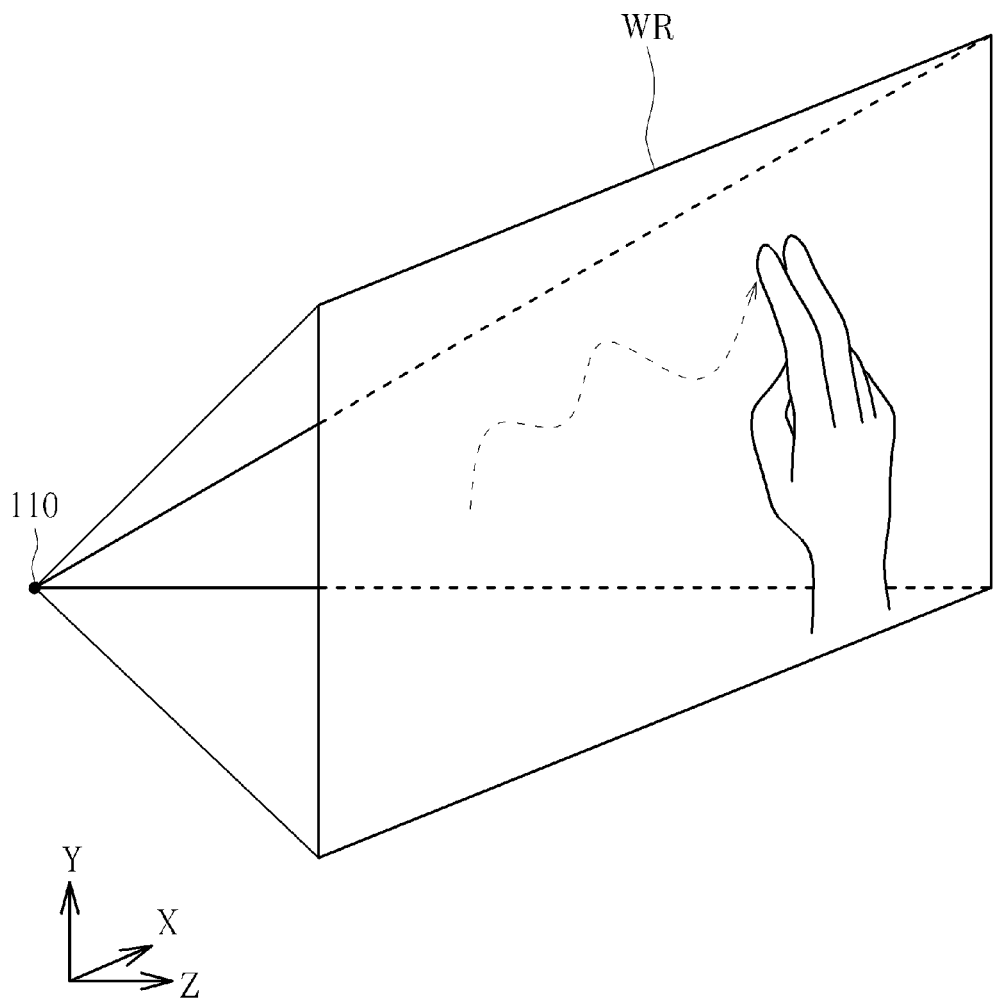
FIG. 9 is a diagram illustrating control over the electronic apparatus shown in FIG. 1 according to another embodiment of the present invention.

The proposed control method may further define corresponding non-contact gestures based on different operation modes. Please refer to FIG. 9 in conjunction with FIG. 1. FIG. 9 is a diagram illustrating control over the electronic apparatus 100 shown in FIG. 1 according to another embodiment of the present invention. In this embodiment, the electronic apparatus 100 executes an item selection command, and the optical sensor module 110 determines that only two specific objects of at least one non-contact object within the non-contact gesture region WR belong to a specific object type. Specifically, the optical sensor module 110 detects only two fingertips. The optical sensor module 110 may further detect movements parallel to the display surface 102 of the two fingertips. When the movements parallel to the display surface 102 of the two fingertips are identical (or similar) to each other, the optical sensor module 110 may recognize is a drag gesture, and accordingly enable the electronic apparatus 100 to perform an item dragging function according to the drag gesture. For example, when the two fingertips moves in an upward, downward, right or left direction simultaneously, the selected item may move in accordance with the movements of the two fingertips. This is similar to using a mouse to drag a selected item.

Figure 10:
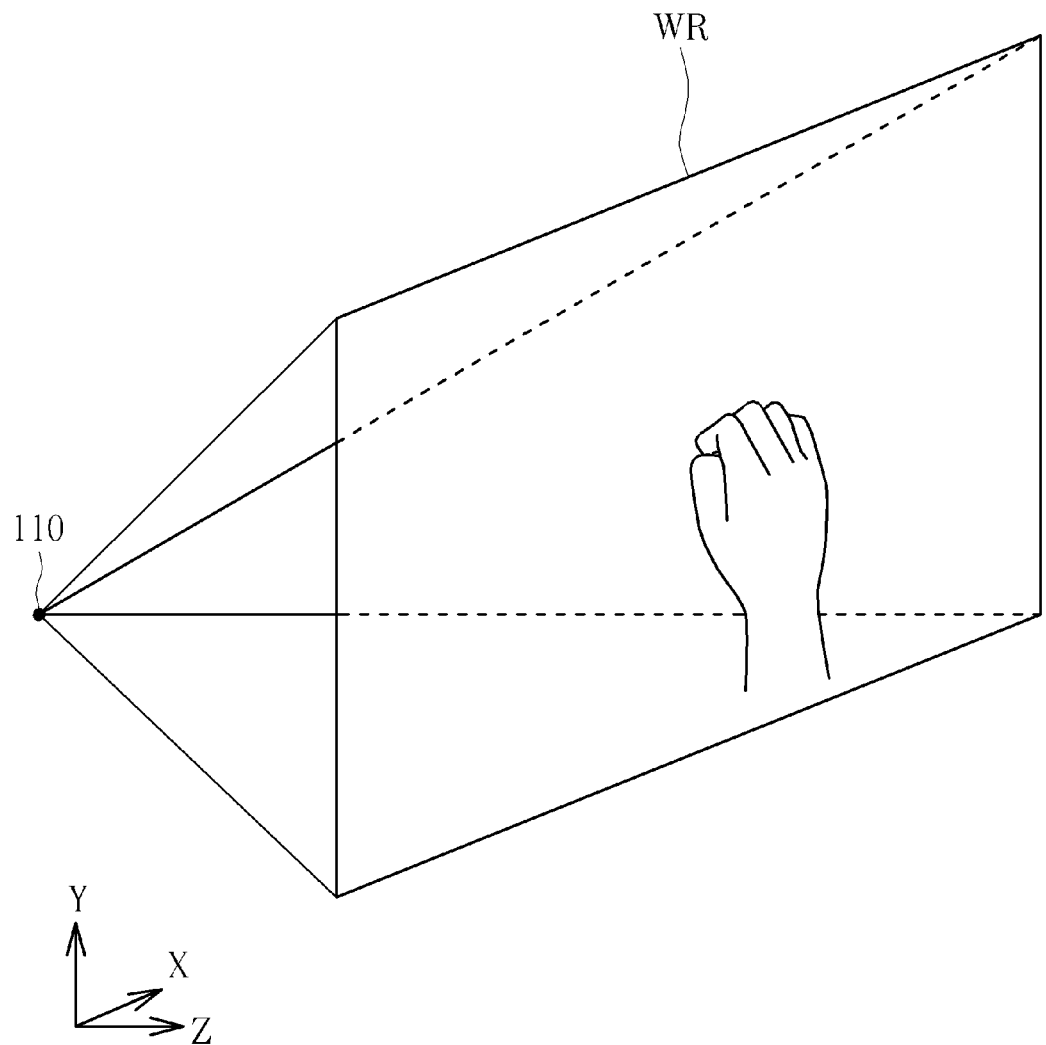
FIG. 10 is a diagram illustrating control over the electronic apparatus shown in FIG. 1 according to another embodiment of the present invention.

Please refer to FIG. 10 in conjunction with FIG. 1. FIG. 10 is a diagram illustrating control over the electronic apparatus 100 shown in FIG. 1 according to another embodiment of the present invention. In this embodiment, the optical sensor module 110 may determine that at least one non-contact object within the non-contact gesture sensitive region WR includes at least three first-type objects and a second-type object. Specifically, the optical sensor module 110 may determine that there are at least three fingertips and one palm included in the non-contact gesture sensitive region WR. The optical sensor module 110 may further detect if the at least three fingertips approaches to the palm, and accordingly recognize a grasping gesture. For example, the optical sensor module 110 may detect if a relative distance between palm and the at least three fingertips decreases by more than a predetermined distance within a predetermined period of time (e.g. 0.5 sec). When the relative distance between the palm and the at least three fingertips decreases by more than the predetermined distance within the predetermined period of time, the optical sensor module 110 may recognize a grasping gesture. Determination of the aforementioned relative distance is described below.

Figure 11:
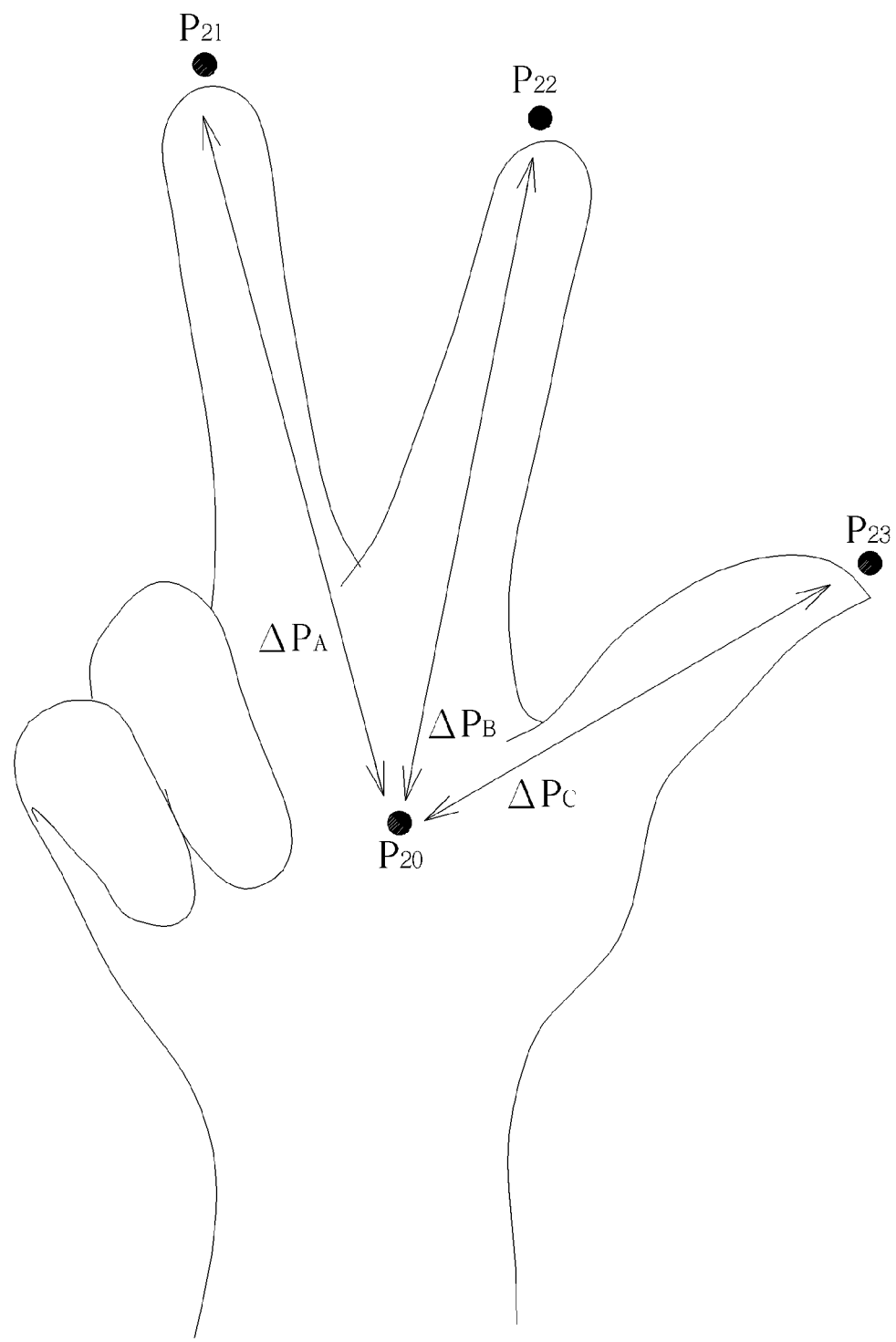
FIG. 11 is an implementation of the relative distance between the palm and the fingertips shown in FIG. 10.

Please refer to FIG. 10 and FIG. 11 together. FIG. 11 is an implementation of the relative distance between the palm and the fingertips shown in FIG. 10. In this implementation, the optical sensor module 110 may identify a plurality of fingertips (located at a plurality of initial positions $P_{21}$-$P_{23}$ respectively) and a palm (located at an initial position $P_{20}$). Regarding each fingertip, the optical sensor module 110 may detect an object distance $\Delta P_A/\Delta P_B/\Delta P_C$ between the fingertip and the palm, and determine if the object distance $\Delta P_A/\Delta P_B/\Delta P_C$ decreases by more than a predetermined distance within a predetermined period of time (e.g. 0.5 sec). When each of the object distances $\Delta P_A$-$\Delta P_C$ decreases by more than the predetermined distance within the predetermined period of time, the optical sensor module 110 may determine that the relative distance between the palm and the fingertips decreases by more than the predetermined distance within the predetermined period of time. In other words, when each of the object distances $\Delta P_A$-$\Delta P_C$ decreases by more than the predetermined distance within the predetermined period of time, the optical sensor module 110 may determine that the non-contact gesture performed by the user is a grasping gesture.

In an alternative design, the optical sensor module 110 may refer to a total decrease in the object distances $\Delta P_A$-$\Delta P_C$ during the predetermined period of time to determine whether the non-contact gesture performed by the user is the grasping gesture. For example, the optical sensor module 110 may add up the object distances $\Delta P_A$-$\Delta P_C$ to obtain a sum, and using the sum as the relative distance between the palm and the fingertips. In brief, as long as a situation where each of at least three fingertips approaches a palm may be identified, associated variations and modifications fall within the spirit and scope of the present invention.

Further, when recognizing a grasping gesture, the optical sensor module 110 may enable the electronic apparatus 100 to a quick menu accessing function according to the grasping gesture. This is similar to sliding a finger from an edge of a touch screen toward a center region of the screen.

Figure 12:
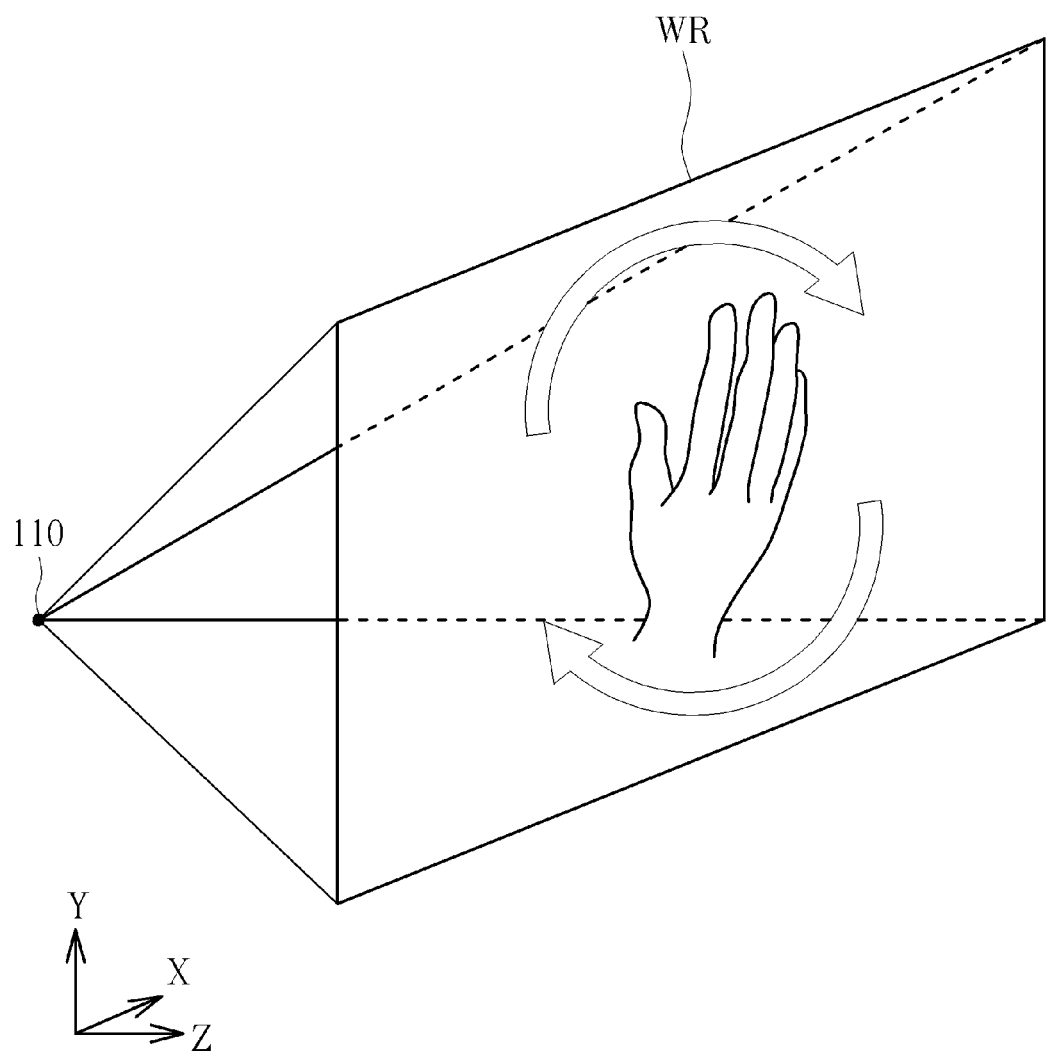
FIG. 12 is a diagram illustrating control over the electronic apparatus shown in FIG. 1 according to another embodiment of the present invention.
Figure 13:
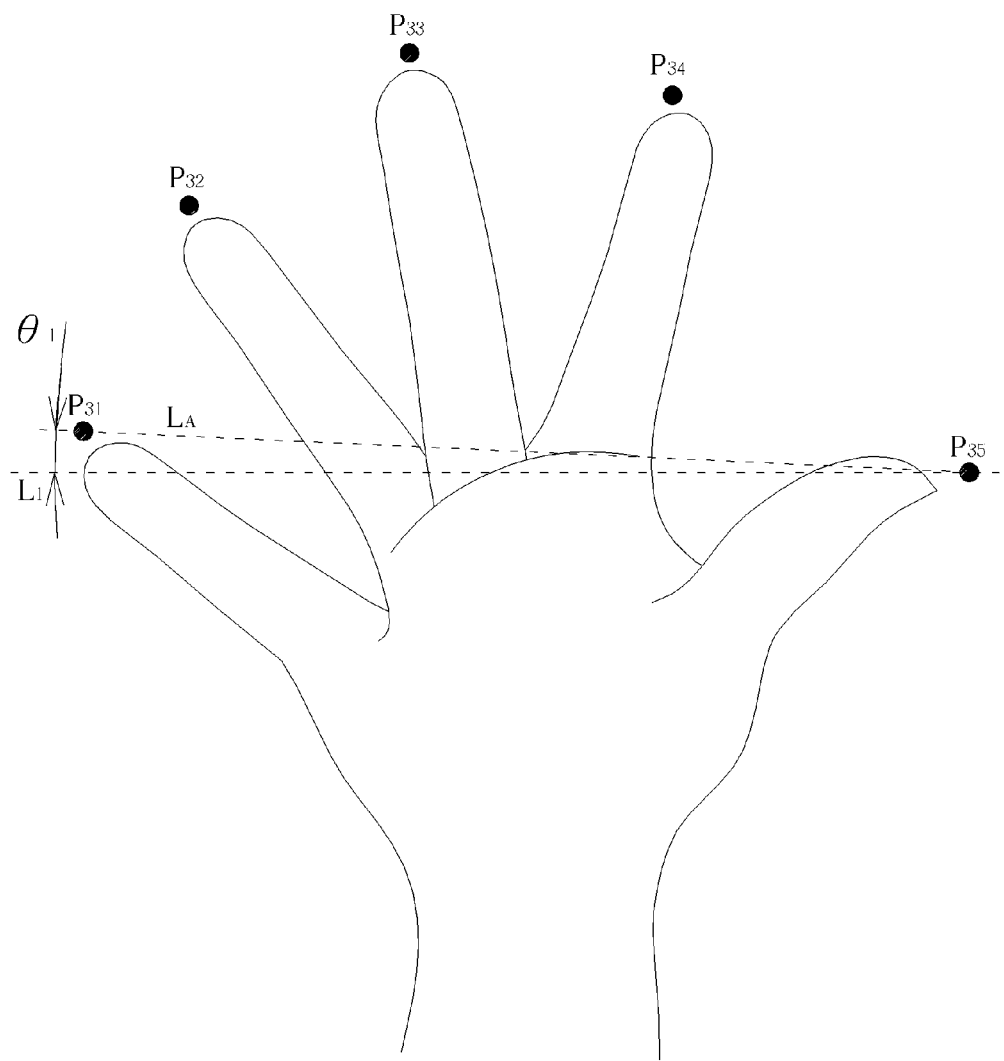
FIG. 13 is a diagram illustrating positions of a plurality of fingertips shown in FIG. 12.

When it is detected that there are at least two non-contact objects within a non-contact gesture sensitive region belong to a specific object type, the proposed control method may further enable an electronic apparatus to perform a rotation function according to connection line(s) between the at least two non-contact objects. Please refer to FIG. 12 and FIG. 13 in conjunction with FIG. 1. FIG. 12 is a diagram illustrating control over the electronic apparatus 100 shown in FIG. 1 according to another embodiment of the present invention, and FIG. 13 is a diagram illustrating positions of a plurality of fingertips shown in FIG. 12. In this embodiment, the optical sensor module 110 may determine that at least two specific objects located within the non-contact gesture sensitive region WR belong to a specific object type. Specifically, the optical sensor module 110 may identify there are five fingertips within the non-contact gesture sensitive region WR, wherein the five fingertips are located at a plurality of initial positions $P_{31}$-$P_{35}$ respectively. The optical sensor module 110 may utilize the respective initial positions $P_{31}$ and $P_{35}$ of two fingertips, farthest from each other in the five fingertips, to form a connection line $L_A$, and detect an angle $\theta_1$ between the connection line $L_A$ and a reference line (i.e. a horizontal line $L_1$). When the angle $\theta_1$ is greater than a specific angle (e.g. 10 degrees), the optical sensor module 110 may recognize a rotation gesture (i.e. the user triggers a rotation event).

When recognizing a rotation gesture, the optical sensor module 110 may enable the electronic apparatus 100 to perform an item rotating function or a displayed content rotating function according to the rotation gesture, wherein a rotation direction may be determined by a direction in which the fingertips rotate, and/or a rotation angle may be determined by an angle between a connection line of the fingertips and a reference line (e.g. the angle $\theta_1$).

Please note that the above is for illustrative purposed only, and is not meant to be a limitation of the present invention. In one implementation, the optical sensor module 110 may form the connection line $L_4$ according to projection points of the initial positions $P_{31}$ and $P_{35}$ on the display surface 102. In other words, in a case where the Z-axis direction is defined as a normal vector of the display surface 102, and the display surface 102 (or a reference surface parallel to the display surface 102) is defined as an X-Y plane, the optical sensor module 110 may refer to an angle between a connection line formed by the initial positions $P_{31}$ and $P_{35}$ on the X-Y plane and a reference line on the X-Y plane to determine whether the user triggers a rotation event.

In another implementation, as long as at least two non-contact objects included in the non-contact gesture region WR are identified to belong to a specific object type (e.g. a fingertip), the optical sensor module 110 may utilize the respective positions of two non-contact objects, farthest from each other in the at least two non-contact objects, to form a connection line, thereby detecting an angle between the connection line and a reference line to determine whether a rotation event occurs.

Figure 14:
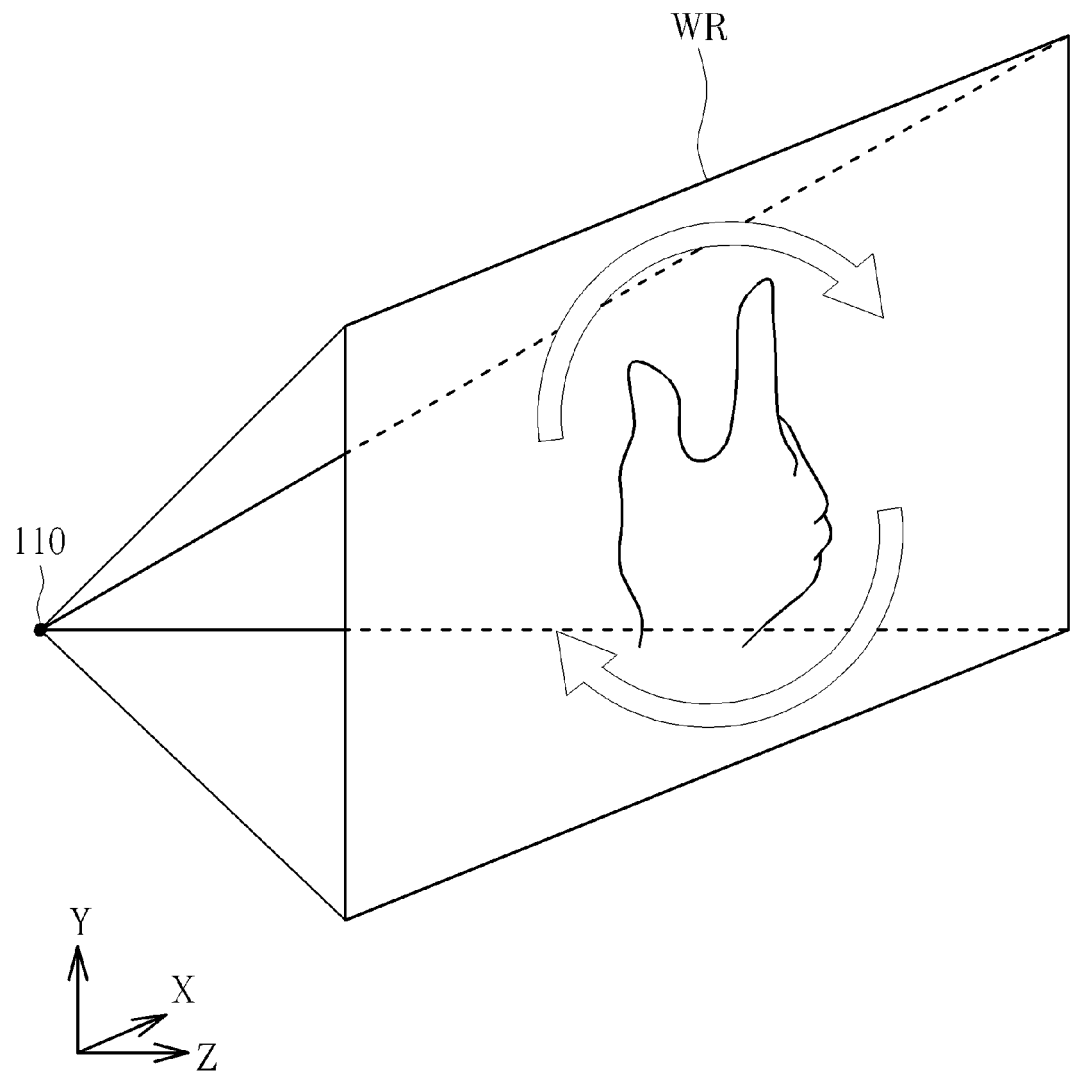
FIG. 14 is a diagram illustrating control over the electronic apparatus shown in FIG. 1 according to another embodiment of the present invention.
Figure 15:
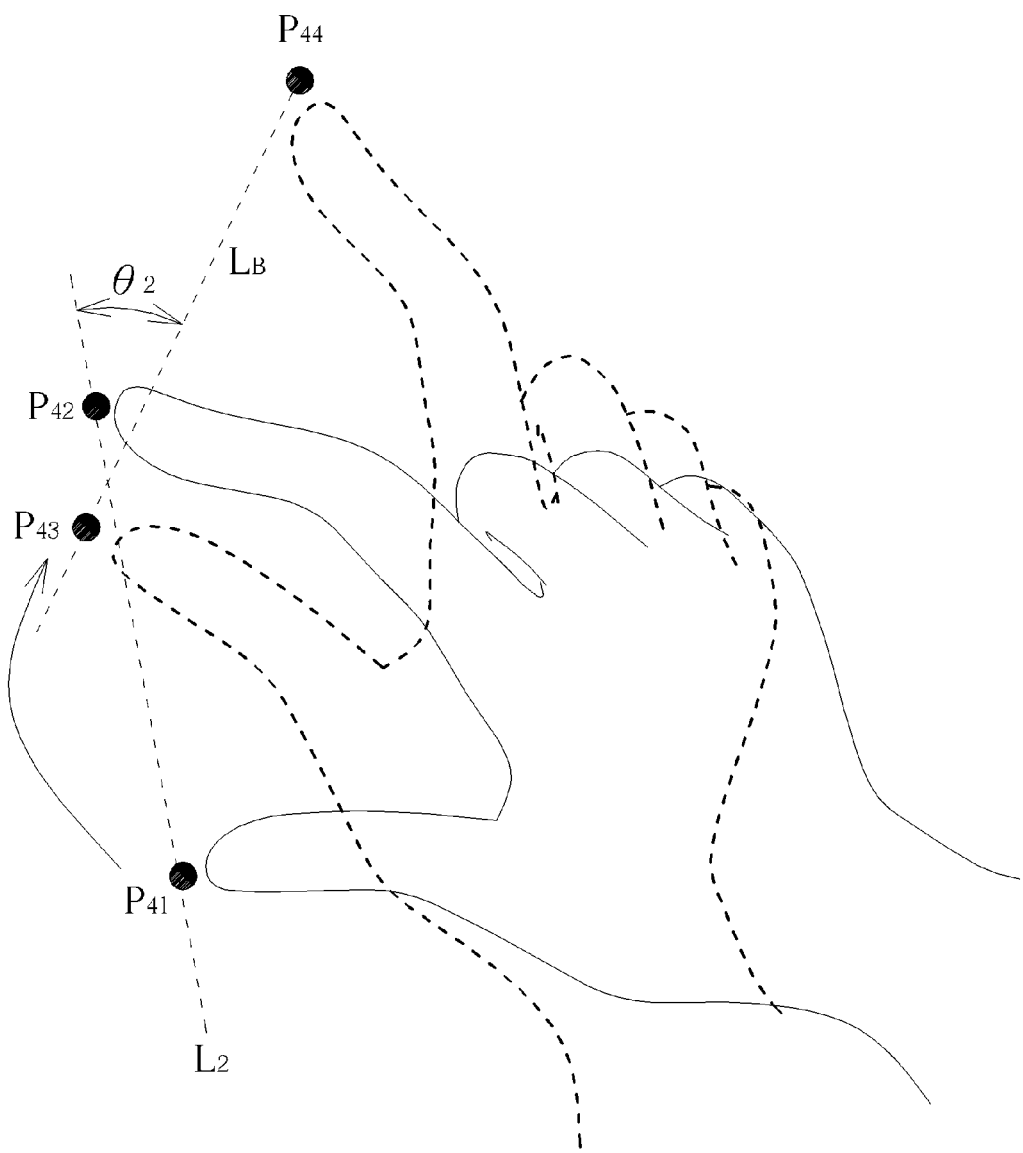
FIG. 15 is a diagram illustrating positions of a plurality of fingertips shown in FIG. 12.

Please note that the aforementioned reference line is not limited to the horizontal line $L_1$, and may be designed according to actual requirements. Please refer to FIG. 14 and FIG. 15 in conjunction with FIG. 1. FIG. 14 is a diagram illustrating control over the electronic apparatus 100 shown in FIG. 1 according to another embodiment of the present invention, and FIG. 15 is a diagram illustrating positions of a plurality of fingertips shown in FIG. 14. In this embodiment, the optical sensor module 110 may determine that only two specific objects of at least one non-contact objects within the non-contact gesture sensitive region WR belong to a specific object type. Specifically, the optical sensor module 110 merely detects two fingertips, which are located at an initial position $P_{41}$ and an initial position $P_{42}$ respectively. Next, the optical sensor module 110 may detect if the two fingertips stay at the initial position $P_{41}$ and the initial position $P_{42}$ over a predetermined period of time respectively. When the two fingertips stay at the initial position $P_{41}$ and the initial position $P_{42}$ over the predetermined period of time respectively, the optical sensor module 110 may use a connection line $L_2$ formed by the initial position $P_{41}$ and the initial position $P_{42}$ (e.g. a connection line projected on the X-Y plane) as a reference line. When the user's hand rotates (i.e. the two fingertips move to a position $P_{43}$ and a position $P_{44}$ respectively; depicted in dashed lines), the optical sensor module 110 may detect if an angle $\theta_2$ between a connection line $L_B$ (e.g. a connection line projected on the X-Y plane) and the connection line $L_2$ (the reference line) is greater than a specific angle (e.g. 10 degrees), thereby determining whether a rotation event occurs. It should be noted that the definition of the reference line shown in FIG. 15 may be applied to an embodiment involving at least three fingertips (e.g. the embodiment shown in FIG. 12).

In addition, although object types in the embodiments shown in FIGS. 3-15 are implemented by a fingertip and a palm, this is not meant to be a limitation of the present invention. As long as a non-contact gesture is recognized according to the number, type(s) and motion information of non-contact object(s), associated variations and modifications fall within the spirit and scope of the present invention.

Moreover, the proposed control method of an electronic apparatus may directly refer to the number and motion information of non-contact objects to recognize a non-contact gesture without identifying object types of the non-contact objects, and accordingly enable the electronic apparatus to perform a corresponding function. For example, in the embodiment shown in FIG. 7, the optical sensor module 110 may directly identify the number of non-contact objects of at least one non-contact object without determining object type(s) of the at least one non-contact object within the non-contact gesture sensitive region WR. Specifically, the optical sensor module 110 may detect that there are only two non-contact objects (located at the initial position $P_{11}$ and the initial position $P_{12}$ respectively) within the non-contact gesture sensitive region WR. The optical sensor module 110 may further detect a relative distance between the two fingertips when the two fingertips stay at the initial position $P_{11}$ and the initial position $P_{12}$ over a predetermined period of time respectively, thereby determining whether the user performs a zoom gesture. Similarly, the control over the electronic apparatus 100 shown in FIGS. 3, 5, 6, 9, 12 and 14 may not need to identify type(s) of non-contact object(s).

Figure 16:
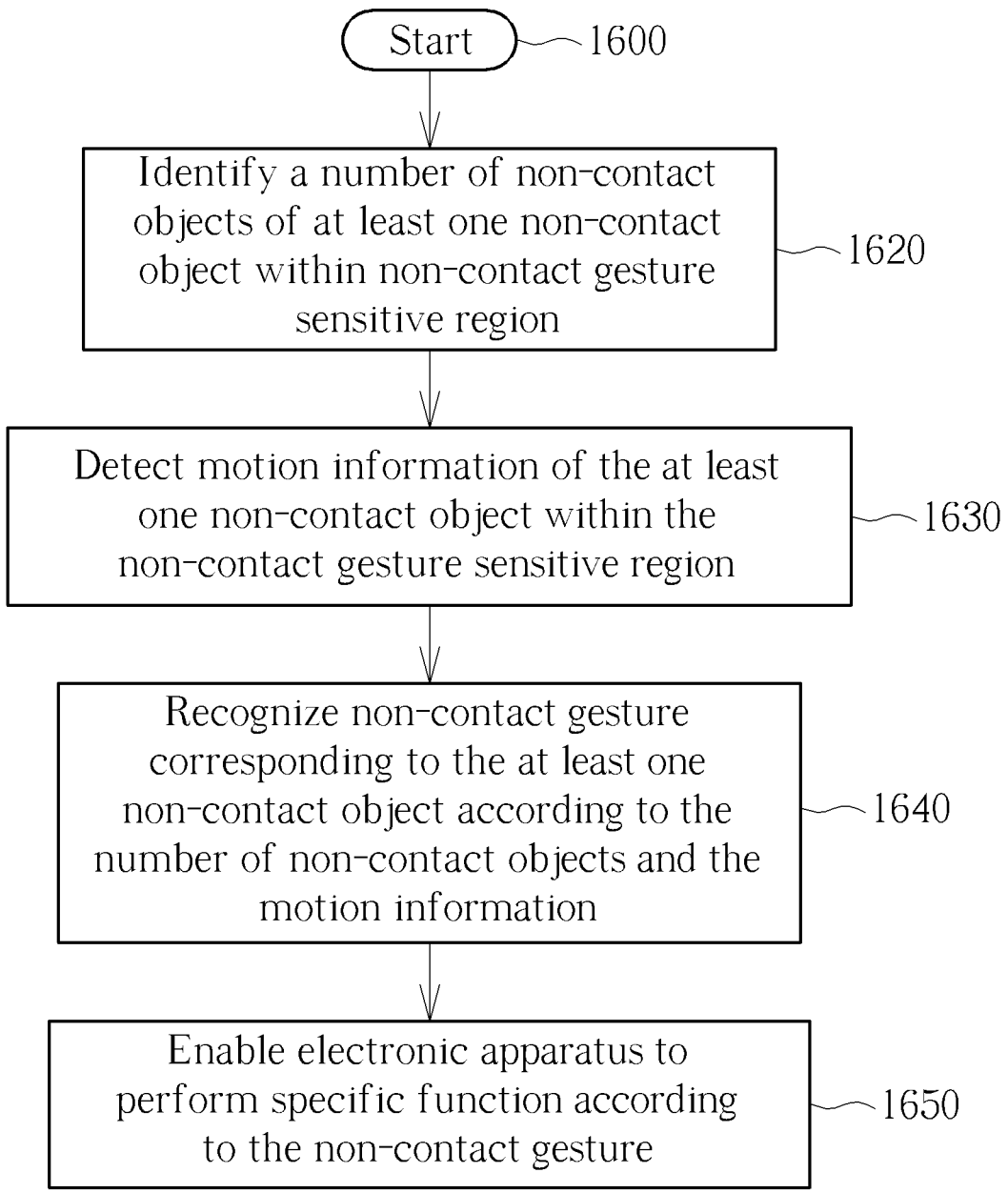
FIG. 16 is a flow chart of an exemplary control method of an electronic apparatus according to another embodiment of the present invention.

In brief, in a case where identification of type(s) of non-contact object(s) is not required (or all of non-contact objects are regarded to belong to the same object type), the proposed control method of an electronic apparatus may be summarized in FIG. 16. FIG. 16 is a flow chart of an exemplary control method of an electronic apparatus according to another embodiment of the present invention. Provided that the result is substantially the same, steps are not required to be executed in the exact order shown in FIG. 16. For example, the steps shown in FIG. 16 are not required to be contiguous; other intermediate steps can be added. The control method shown in FIG. 16 may be summarized as below.

Step 1600: Start.

Step 1620: Identify a number of non-contact objects of at least one non-contact object within a non-contact gesture sensitive region (e.g. the number of fingertips).

Step 1630: Detect motion information of the at least one non-contact object within the non-contact gesture sensitive region.

Step 1640: Recognize a non-contact gesture corresponding to the at least one non-contact object according to the number of non-contact objects and the motion information.

Step 1650: Enable the electronic apparatus to perform a specific function.

As a person skilled in the art should understand the operation of each step shown in FIG. 16 after reading the paragraphs directed to FIGS. 1-15, further description is omitted here for brevity.

To sum up, the proposed control method of an electronic apparatus can not only provide non-contact human-computer interaction but also meet requirements of various and intuitive non-contact gestures. Hence, the proposed non-contact control method can be combined with (or replace) a touch control method (e.g. using a mouse or a touch panel to control the electronic apparatus), and can be employed in various operating systems (e.g. Windows operating system or Android operating system).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of an electronic apparatus, the electronic apparatus having a non-contact gesture sensitive region and a display surface, the control method comprising:

identifying at least one object type of at least one non-contact object within the non-contact gesture sensitive region and determining respective numbers of non-contact objects corresponding to the identified at least one object type as that the at least one non-contact object comprises at least three first-type objects and a second-type object;

detecting if a relative distance between the second-type object and the at least three first-type objects decreases by more than a predetermined distance during a predetermined period of time;

recognizing a non-contact gesture as a grasping gesture when the relative distance between the second-type object and the at least three first-type objects decreases by more than the predetermined distance within the predetermined period of time; and enabling the electronic apparatus to perform a specific function according to the non-contact gesture.

2. The control method of claim 1, wherein the step of detecting if the relative distance between the second-type object and the at least three first-type objects decreases by more than the predetermined distance during the predetermined period of time comprises:

regarding each first-type object:
detecting an object distance between the first-type object and the second-type object; and
determining if the object distance decreases by more than the predetermined distance within the predetermined period of time;

wherein when respective object distances between the second-type object and the at least three first-type objects decrease by more than the predetermined distance within the predetermined period of time, it is determined that the relative distance between the second-type object and the at least three first-type objects decreases by more than the predetermined distance within the predetermined period of time.

3. The control method of claim 1, wherein the step of detecting if the relative distance between the second-type object and the at least three first-type objects decreases by more than the predetermined distance during the predetermined period of time comprises:

regarding each first-type object:
detecting an object distance between the first-type object and the second-type object; and
adding up respective object distances between the second-type object and the at least three first-type objects to obtain a sum, and using the sum as the relative distance between the second-type object and the at least three first-type objects.

4. The control method of claim 1, wherein the step of enabling the electronic apparatus to perform the specific function according to the non-contact gesture comprises:
enabling the electronic apparatus to a quick menu accessing function according to the grasping gesture.

5. The control method of claim 1, wherein each first-type object is a fingertip, and the second-type object is a palm.

6. A control method of an electronic apparatus, the electronic apparatus having a non-contact gesture sensitive region, the control method comprising:

identifying at least one object type of at least one non-contact object within the non-contact gesture sensitive region and determining respective numbers of non-contact objects corresponding to the identified at least one object type, wherein it is determined that at least two specific objects of the at least one non-contact object belong to a specific object type, detecting the motion information of the at least one non-contact object within the non-contact gesture sensitive region comprises:
utilizing respective positions of two specific objects of the at least two specific objects to form a first connection line, wherein the two specific objects are farthest from each other; and
detecting an angle between the first connection line and a reference line;
recognizing a non-contact gesture as a rotation gesture when the angle is greater than a specific angle; and
enabling the electronic apparatus to perform a specific function according to the non-contact gesture.

7. The control method of claim 6, wherein when it is determined that only the two specific objects of the at least one non-contact object belong to the specific object type, the step of detecting the motion information of the at least one non-contact object within the non-contact gesture sensitive region comprises:

detecting if the two specific objects respectively located at a first initial position and a second initial position stay at the first initial position and the second initial position over a predetermined period of time respectively; and
when the two specific objects stay at the first initial position and the second initial position over the predetermined period of time respectively, using a second connection line formed by the first initial position and the second initial position as the reference line.

8. The control method of claim 6, wherein the step of enabling the electronic apparatus to perform the specific function according to the non-contact gesture comprises:
enabling the electronic apparatus to perform an item rotating function or a displayed content rotating function according to the rotation gesture.

9. The control method of claim 6, wherein each specific object is a fingertip.

10. A control method of an electronic apparatus, the electronic apparatus having a non-contact gesture sensitive region, the control method comprising:

identifying a number of non-contact objects of at least one non-contact object within the non-contact gesture sensitive region as comprising at least two non-contact objects;
utilizing respective positions of two non-contact objects of the at least two non-contact objects to form a first connection line, wherein the two non-contact objects are farthest from each other; and
detecting an angle between the first connection line and a reference line;
recognizing a non-contact gesture as a rotation gesture when the angle is greater than a specific angle; and
enabling the electronic apparatus to perform a specific function according to the non-contact gesture.

11. The control method of claim 10, wherein when it is determined that the at least one non-contact object comprises the two non-contact objects only, the step of detecting the motion information of the at least one non-contact object within the non-contact gesture sensitive region comprises:

detecting if the two non-contact objects respectively located at a first initial position and a second initial position stay at the first initial position and the second initial position over a predetermined period of time respectively; and
when the two non-contact objects stay at the first initial position and the second initial position over the predetermined period of time respectively, using a second connection line formed by the first initial position and the second initial position as the reference line.

12. The control method of claim 10, wherein the step of enabling the electronic apparatus to perform the specific function according to the non-contact gesture comprises:
   enabling the electronic apparatus to perform an item rotating function or a displayed content rotating function according to the rotation gesture.

* * * * *